United States Patent [19]

Gerkema et al.

[11] 4,357,555
[45] Nov. 2, 1982

[54] ROTARY ANODE X-RAY TUBE

[75] Inventors: Jan Gerkema; Evert M. H. Kamerbeek, both of Eindhoven, Netherlands

[73] Assignee: U.S. Philips Corporation, New York, N.Y.

[21] Appl. No.: 147,885

[22] Filed: May 8, 1980

[30] Foreign Application Priority Data

May 8, 1979 [NL] Netherlands ................. 7903580

[51] Int. Cl.³ .............................................. H01J 35/04
[52] U.S. Cl. .................................................. 378/135
[58] Field of Search .................. 313/60; 250/406, 402

[56] References Cited

U.S. PATENT DOCUMENTS

| | | | |
|---|---|---|---|
| 2,293,527 | 8/1942 | Atlee | 250/148 |
| 3,720,853 | 3/1973 | Atlee et al. | 313/60 |
| 3,801,846 | 4/1974 | Haberrecker | 313/60 |
| 3,878,395 | 4/1975 | Seifert et al. | 313/60 |
| 4,097,760 | 6/1978 | Cimelli | 313/60 |
| 4,210,371 | 7/1980 | Gerkema et al. | 313/60 |

Primary Examiner—Bruce C. Anderson
Attorney, Agent, or Firm—Marc D. Schechter

[57] ABSTRACT

An X-ray tube having a rotary anode which is supported by a bearing system comprising an axial magnetic bearing and at least one radial sleeve bearing. In operation, mutually cooperating metal (e.g. W or Mo) supporting faces of the sleeve bearing are separated by a liquid layer wetting the supporting faces. The liquid layer consists of a metal or a metal alloy, such as Ga or a Ga alloy, whose vapor pressure at 300° C. is below $10^{-5}$ N/m², and which does not attack the supporting faces to any substantial extent. The tube has a long life, produces little noise during operation, and is of relatively simple construction.

10 Claims, 3 Drawing Figures

ROTARY ANODE X-RAY TUBE

BACKGROUND OF THE INVENTION

The invention relates to an X-ray tube comprising an envelope containing a rotary anode which is rotatable about an axis. A motor rotor which is driven by a motor stator outside the envelope, drives the rotary anode. The anode is axially and radially supported by a bearing system.

Such an X-ray tube is particularly suitable for use as a radiation source in medical X-ray diagnostic apparatus.

U.S. Pat. No. 2,293,527 discloses an X-ray tube as described above. In this tube, the bearing system comprises two metal, lubricated ball bearings. To reduce wear in such an X-ray tube as much as possible, the anode is rotated substantially only when the X-ray tube emits radiation. The rotor is accelerated to normal operating speed before the tube is used, and the rotor is brought to rest after use. In spite of this, the life of the X-ray tube is short because the ball bearings have a short life.

The short life of each of the ball bearings is particularly due to the fact that a portion of the heat generated during operation of the anode is dissipated via the bearings. It is possible for the average temperature of the ball bearings to increase to approximately 300° C. In addition, the ball bearings must operate in a vacuum. In such circumstances, ball bearings cannot be sufficiently lubricated so that the ball bearings must have a sufficiently large clearance to prevent the bearings from seizing up. Consequently, the X-ray tube is far from noise-free in operation. This noise is very irritating for a patient examined by an apparatus provided with such an X-ray tube. The life of each of the ball bearings is still further reduced by the fact that the tube current is passed through the bearings. This results in spark erosion of the bearing.

SUMMARY OF THE INVENTION

An object of the invention is to provide a rotary anode X-ray tube of fairly simple construction and in which the bearings have long lives and are relatively quiet in operation.

According to the invention, an X-ray tube as described above is characterized in that the bearing system comprises an axial magnetic bearing and a radial sleeve bearing. In operation, mutually cooperating metal supporting faces of the sleeve bearing are separated by a liquid layer wetting the supporting faces. This liquid layer comprises a metal or a metal alloy whose vapor pressure at 300° C. is below $10^{-5}$ N/m$^2$, and which does not attack the supporting faces to any substantial extent.

Wetting of the supporting faces by means of this liquid layer is to be understood to mean a wetting in which there is a direct interaction between the metal atoms in the supporting face and the atoms in the layer. Such a wetting is of such a high quality that, when the bearing is loaded, the cooperating supporting faces of the bearing are fully separated from one another, preventing "seizing up".

Furthermore, due to the high surface tension of metals or alloys both in when stationary and during rotation, the liquid metal or the liquid metal alloy is not forced out of the bearing. Seizing up of the bearing is thus prevented, and both wear and the production of noise can be very low.

During operation, both the tube current and the heat generated in the anode can easily pass through the bearing without causing damage because metals have relatively good electrical and thermal conduction characteristics. Therefore, the bearing may be in continuous operation for a long period of time, for example a working day. It is now possible to switch the high voltage of the tube on and off as required, without waiting for the anode to reach the operating speed. In addition to a long service life, low noise and satisfactory electrical and thermal conduction characteristics, the radial sleeve bearing, which need be no more than a bushing which closely surrounds a shaft, can be of a very simple, and consequently cheap construction.

It should be noted that French Pat. No. 919,837 discloses a bearing system intended for use in a water pump comprising an axial magnetic bearing and two radial sleeve bearings. These sleeve bearings each comprise a bushing which is connected to a bearing stator and which encloses a shaft to be supported. Oil, grease or water are used as the lubricant. Such sleeve bearings are, however, not suitable for use in X-ray tubes because with the rotational speeds customarily used in X-ray tubes these lubricants are forced out of the bearing due to their low surface tension. As a result, these bearings may jam if used in X-ray tubes. Furthermore, when such sleeve bearings are used, neither the tube current nor the heat generated in the anode can easily pass through the bearings because these lubricants are both electrical and thermal insulators.

A preferred embodiment of the invention is characterized in that the axial magnetic bearing comprises a magnetic circuit through the motor stator and the motor rotor. The magnetic circuit comprises a magnet yoke, which is magnetizable by a magnet outside the envelope, and a bearing rotor connected to the rotary anode. The bearing stator and bearing rotor have coaxial, opposed faces with corresponding patterns. Each pattern is a plurality of radially-extending portions axially separated from one another by circumferential grooves. Corresponding radially extending portions on the two faces are radially separated by gaps. Since the electric motor, which drives the rotary anode and which comprises the motor stator and motor rotor, incorporates a closed magnetic circuit, stray fields generated by alternating currents flowing in this motor are shielded. In this way, electromagnetic interference with the electron beam inside the tube and with other equipment outside the tube is reduced.

A compact X-ray tube embodying the invention is characterized in that the axial magnetic bearing comprises the motor stator and the motor rotor. The motor stator comprises a magnet yoke. The motor rotor is also a bearing rotor connected to the rotary anode. The bearing stator and bearing rotor have coaxial, opposed faces with corresponding patterns. Each pattern comprises a plurality of radially-extending portions axially separated from one another by circumferential grooves. Corresponding portions on the two faces are radially separated by respective gaps. Here, the magnetic circuit of the motor is also the magnetic circuit of the axial magnetic bearing. Accordingly, a separate circuit as well as a separate magnet for the magnetization of the bearing can be omitted.

DESCRIPTION OF THE PREFERRED EMBODIMENTS

Figure 1:
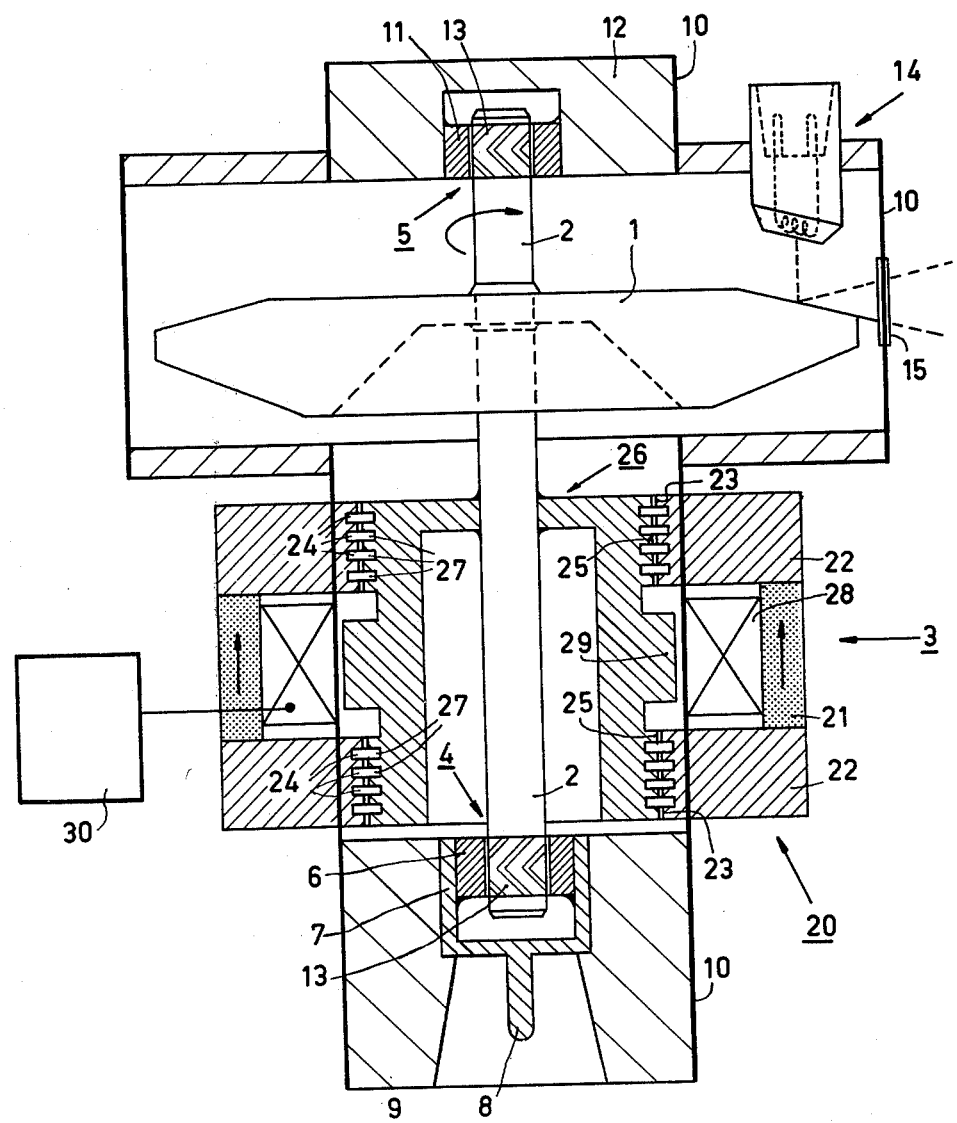
FIG. 1 is a side elevational view, partly in cross-section, of an X-ray tube according to the invention.

Referring to FIG. 1, there is shown an X-ray tube having a shaft 2 carrying a rotary anode 1. Shaft 2 is supported by a bearing system comprising an axial magnetic bearing 3 and two radial sleeve bearings 4 and 5.

The sleeve bearing 4 consists of a bushing 6 which closely surrounds the shaft 2. Bushing 6 is fitted in a metal cup 7 having, extending away from the bearing 4, a pin 8 to which the tube high voltage can be connected. The metal cup 7 is mechanically connected to a stainless steel portion of the tube envelope 10 by an insulator 9 made of densely sintered $Al_2O_3$.

The sleeve bearing 5 consists of a bushing 11 which also closely surrounds the shaft 2. Bushing 11 is similarly mechanically connected to another stainless steel portion of the tube envelope 10 by an insulator 12 made of densely sintered $Al_2O_3$.

Both the shaft 2 and the bushings 6 and 11 are preferably made of one of the metals W or Mo or of an alloy of W and Mo. The shaft 2 is separated from the bushings 6 and 11 by a lubricating layer consisting of Ga or of a Ga alloy which melts at a temperature below 25° C. For example, the lubricating layer can be one of the two binary eutectic compositions 76% Ga–24% In and 92% Ga–8% Sn, which melt at 16.5° C. and 20.0° C., respectively. The specified percentages denote percentages by weight. The ternary eutectic composition 62% Ga–25% In–13% Sn, which melts at 5° C., is also suitable.

The lubricating layer consisting of Ga or of a Ga alloy wets the shaft 2 and the bushings 6 and 11.

Wetting is to be understood to mean that there is direct interaction between the metal atoms in the layer and the metal atoms of the shaft 2 and the bearing bushes 6 and 11. This means that between the layer of Ga or Ga alloy and the shaft 2 and the bushings 6 and 11, there is present neither an oxide layer of the metal of the shaft or of the bushing, nor an oxide layer of Ga or of one of the components of the Ga-alloy.

Such wetting may be obtained by, for example, heating the shaft 2, the bushings 6 and 11 and the Ga or the Ga-alloy in a reducing atmosphere, for example in $H_2$-gas, for some time at 800° C. Any oxides present are then reduced. If thereafter the bearing portions and the Ga or the Ga-alloy are brought into contact with one another in the same atmosphere, possibly at a lower temperature, the desired wetting is produced.

The wetting produced in this manner is so good that the shaft 2 and the bushings 6 and 11, are completely separated from one another in the X-ray tube, both while at rest and while operating. "Seizing-up" of the supporting faces is thus prevented. Also, due to its high surface tension, the Ga or the Ga-alloy is not forced out of the bearing. In the region of the bushings 6 and 11, the shaft 2 is provided with V-shaped pairs of helical grooves 13, the helices being of opposite sense, which additionally cause the Ga or the Ga-alloy to be forced into the bearing in operation. This results in bearings with high dynamic stability. Due to the fact that the vapor pressure of Ga and Ga-alloys is below $10^{-5}$ $N/m^2$ at 300° C., no unexpected gas discharges will occur in the X-ray tube.

Since the shaft 2 and the bushings 6 and 11 consist of one of the metals W or Mo or an alloy of W and Mo, they are not attacked to any substantial extent by Ga or a Ga-alloy. Since magnetic bearings in general and the axial magnetic bearing 3 in particular (described in detail below) operate without mechanical contact between stationary and rotary parts, the bearings 3, 4 and 5, and consequently the X-ray tube, will have a long life. Consequently the rotary anode can be rotated continuously for a long period of time, for example a working day. It is then possible to switch the high voltage on and off as required without the need to wait for the anode to reach its operating speed. The high voltage is connected between the pin 8 and a cathode device 14. Electrons are then accelerated from the cathode device 14 and generate in the rotary anode 1 a beam of X-rays which can leave the tube through a window 15 in the tube wall.

It should be noted that the shaft 2 and the bushings 6 and 11 may alternatively be produced from a metal which can be worked more easily than W or Mo, for example steel. Then, however, the bearings 4 and 5 cannot be lubricated with Ga or Ga-alloys, because metals other than W and Mo are attacked to a substantial extent by Ga. Such attack would reduce the life of the bearings 4 and 5. Should the shaft 2 and the bushings 6 and 11 be made of steel, then lubrication is possible, for example, with an alloy having the composition 49% Bi–18% Pb–12% Sn–21% In. Since, however, this alloy melts at 58° C., the bearing may only rotate when its temperature is above 58° C. This means that when an X-ray tube having such a bearing is used, it must be preheated before rotating the rotary anode 1. Such preheating is not necessary for the combinations of materials in the first embodiment of the invention.

The axial magnetic bearing 3 comprises a bearing stator 20 having a magnet yoke 22 which is in two portions. Yoke 22 is magnetizable by means of a ring-shaped permanent magnet 21 outside the tube envelope. The magnet yoke portions which are inside the tube have pole faces 23 which extend coaxially with the shaft 2 and have axially-spaced circumferential grooves 24. The pole faces 23 are radially separated by gaps from corresponding faces 25, which similarly extend coaxially with the shaft 2, on a cylindrical bearing rotor 26 connected to the shaft 2. The faces 25 have a pattern of circumferential grooves 27 corresponding to the grooves 24. Corresponding radially-extending portions of the faces of the yoke and the faces of the rotor are aligned by the attractive forces generated by the permanent magnet 21. As a result, the shaft 21 is axially supported.

The magnet yoke 22, of the bearing stator 20, and the bearing rotor 26 form a closed magnetic circuit. A motor stator 28 and a motor rotor 29, which is integral with the bearing rotor 26, are arranged inside this closed circuit. During operation, the motor stator 28, which is connected to an alternating current source 30, generates a rotating magnetic field which drives the motor rotor 29. Stray fields produced in the motor stator 28 by the alternating current are shielded by the said closed magnetic circuit, so that electromagnetic interference with the electron beam inside the tube and with apparatus outside the tube is inhibited.

Figure 2:
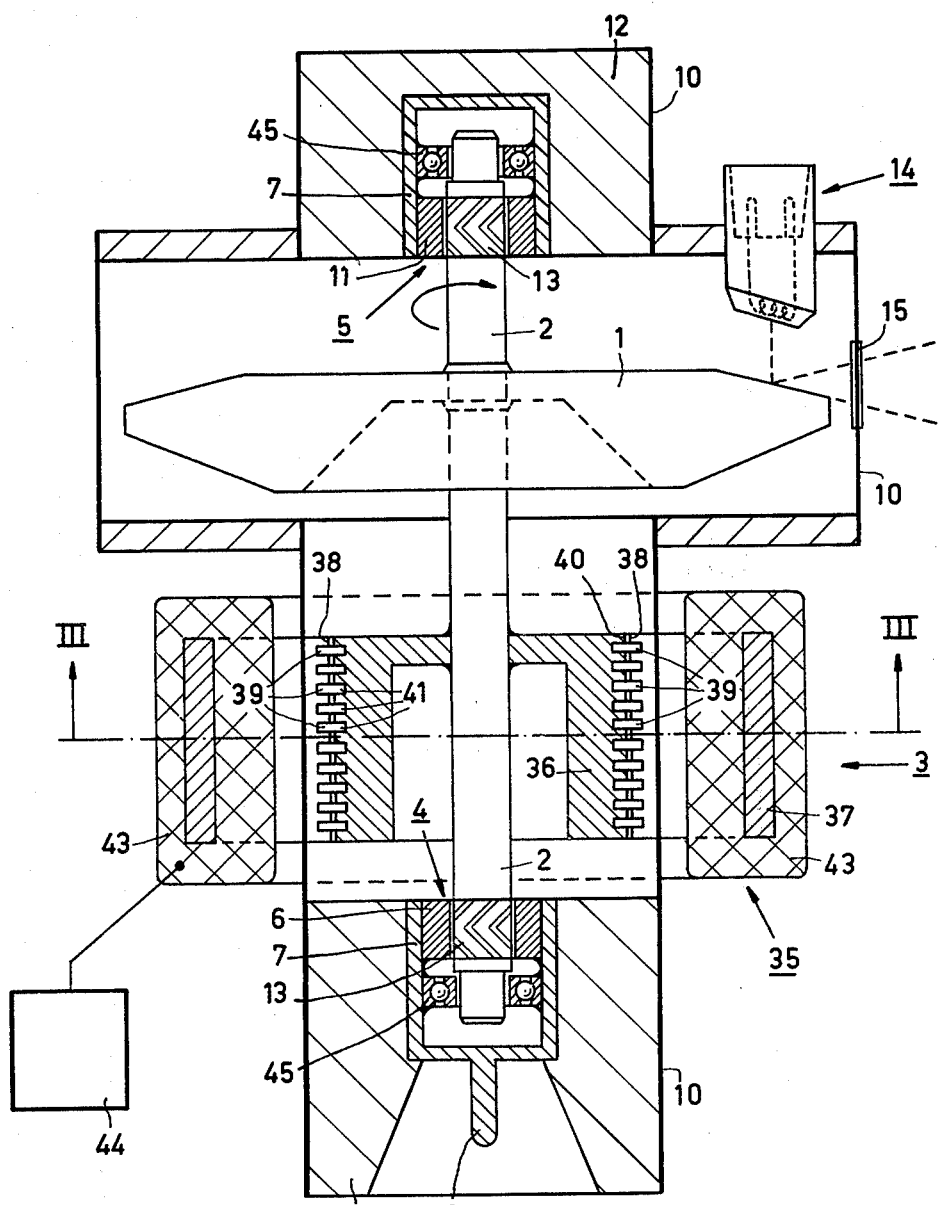
FIG. 2 is a side elevational view, partly in cross-section of an X-ray tube according to the invention having an electric motor which also serves as the axial magnetic bearing for the rotary anode.
Figure 3:
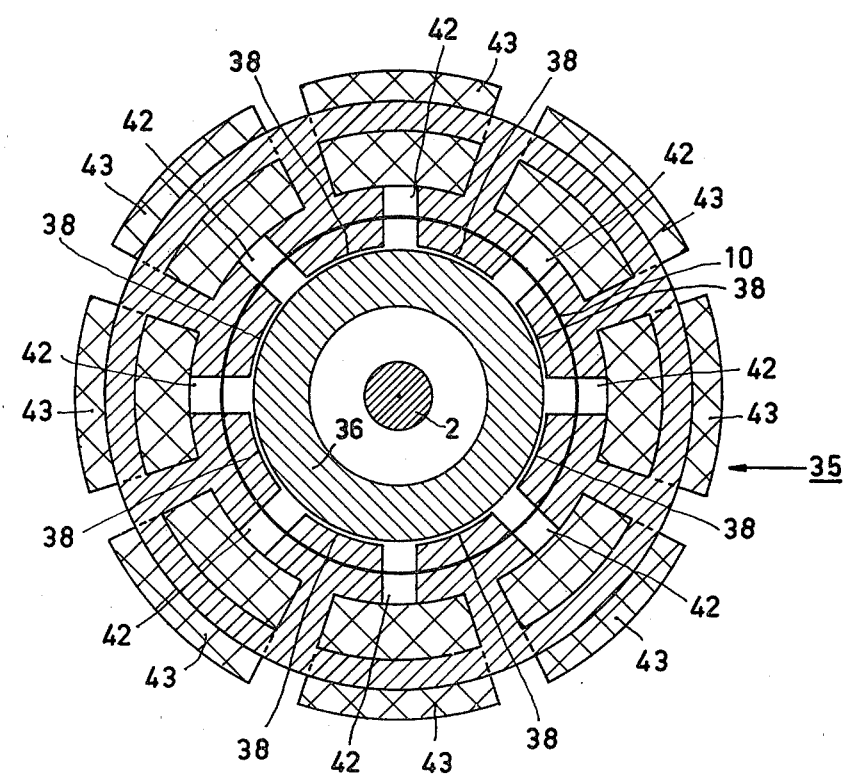
FIG. 3 is a cross-sectional view on the line III—III of the X-ray tube shown in FIG. 2.

FIGS. 2 and 3 are side elevational and axial cross-sectional views, respectively, of an X-ray tube comprising an electric motor which also serves as the axial magnetic bearing for the rotary anode. In these Figures, corresponding components have the same reference numerals as in FIG. 1.

The axial magnetic bearing 3 of FIGS. 2 and 3 comprises a motor stator 35 and a motor rotor 36 connected to the shaft 2. The motor stator 35 comprises a magnet yoke 37 having a pole face 38 which extends coaxially with the shaft 2 and which has axially-spaced circumferential grooves 39. The pole face 38 is radially separated from a corresponding face 40 on the cylindrical motor rotor 36. The face 40 is also coaxial with the shaft 2 and has circumferential grooves 41 corresponding to the grooves 39 in the pole face 38. The motor stator 37 comprises a number of apertures 42 which divide the pole face 38 into sections. Field coils 43 are arranged in and around the apertures 42 and are connected to an alternating current source 44. During operation, the alternating current through the field coils 43 generates in the magnet yoke 37 in the motor rotor 36 rotary magnetic fields which not only drive motor rotor 36 but which also accurately align corresponding radially-extending portions of the faces 38 and 40, between the grooves 39 and 41 therein, so that the rotary anode 1 is axially supported.

When the alternating current is cut off to the motor, this also cuts off the axial support of the anode. For this reason the X-ray tube is also provided with two ball bearings 45, which support the shaft 2 in such a way that when the axial magnetic bearing 3 is not energized, the faces 38 and 40 of the motor stator 35 and the motor rotor 36, respectively, are prevented from contacting each other.

What is claimed is:

1. An X-ray tube comprising:
    an envelope;
    a rotary anode in the envelope, said anode being rotatable around an axis and being axially and radially supported on the axis by a bearing system;
    a motor stator outside the envelope; and
    a motor rotor attached to the rotary anode for rotating the rotary anode on the axis in cooperation with the motor stator;
    characterized in that the bearing system comprises:
        a magnetic bearing for supporting the rotary anode axially; and
        at least one sleeve bearing for supporting the rotary anode radially, said sleeve bearing comprising cooperating metal supporting faces separated by a liquid layer of a metal or metal alloy which wets the supporting faces without substantially attacking the supporting faces, said metal alloy having a vapor pressure below $10^{-5}$ N/m$^2$ at 300° C.

2. An X-ray tube as claimed in claim 1, characterized in that the magnetic bearing comprises at least one magnetic circuit through the motor stator and the motor rotor.

3. An X-ray tube as claimed in claim 2, characterized in that:
    the motor stator comprises a first magnetic yoke which is also the bearing stator and which is magnetizable by a magnet outside the envelope;
    the motor rotor comprises a second magnetic yoke which is also the bearing rotor;
    each yoke has a coaxial face with a pattern of radially extending portions, said radially extending portions being axially separated from one another by coaxial grooves, said stator yoke pattern corresponding to and being arranged opposite to said rotor yoke pattern, corresponding radially extending portions of the two yoke faces being radially separated by gaps such that the outer diameter of the rotor yoke face is less than the inner diameter of the stator yoke face.

4. An X-ray tube as claimed in claim 3, characterized in that the metal supporting faces of the sleeve bearing comprise tungsten, molybdenum, or an alloy of tungsten and molybdenum, and the liquid layer comprises gallium or a gallium alloy which melts at a temperature below 25° C.

5. An X-ray tube as claimed in claim 4, characterized in that at least one of the supporting surfaces of the sleeve bearing is provided with helical grooves for retaining the liquid layer between the supporting surfaces during rotation of the rotary anode.

6. An X-ray tube as claimed in claim 1, 2, or 3, characterized in that the metal supporting faces of the sleeve bearing comprise a metal which can be worked more easily than tungsten or molybdenum.

7. An X-ray tube as claimed in claim 6, characterized in that the metal supporting faces of the sleeve bearing comprise steel.

8. An X-ray tube as claimed in claim 7, characterized in that the liquid layer comprises an alloy having the composition 49 weight percent bismuth, 18 weight percent lead, 12 weight percent tin, and 21 weight percent In.

9. An X-ray tube as claimed in claim 8, characterized in that the tube further comprises means for preheating the tube to at least 58° C.

10. An X-ray tube as claimed in claim 9, characterized in that at least one of the supporting surfaces of the sleeve bearing is provided with helical grooves for retaining the liquid layer between the supporting surfaces during rotation of the rotary anode.